US007683826B2

(12) United States Patent
Leiras

(10) Patent No.: US 7,683,826 B2
(45) Date of Patent: Mar. 23, 2010

(54) METHOD OF ELECTROMAGNETIC COUPLING BETWEEN A RADAR IN THE L BAND AND RADIONAVIGATION EQUIPMENT ITEM AND AUTOPROTECTION AND RADIONAVIGATION DEVICE

(75) Inventor: Carlos Leiras, Boulogne Billancourt (FR)

(73) Assignee: Thales (FR)

( * ) Notice: Subject to any disclaimer, the term of this patent is extended or adjusted under 35 U.S.C. 154(b) by 333 days.

(21) Appl. No.: 11/338,874

(22) Filed: Jan. 25, 2006

(65) Prior Publication Data

US 2006/0262005 A1    Nov. 23, 2006

(30) Foreign Application Priority Data

Jan. 28, 2005   (FR)   ................................ 05 00894

(51) Int. Cl.
*G01S 7/285* (2006.01)
*G01S 13/86* (2006.01)
*G01S 13/00* (2006.01)

(52) U.S. Cl. .......................... 342/159; 342/42; 342/46; 342/47; 342/118; 342/125; 342/175

(58) Field of Classification Search .................. 342/13, 342/14, 29–40, 42–51, 52, 56, 59, 118, 125, 342/159, 175, 195, 82, 89–103, 160–164, 342/357.01–357.17, 385–416

See application file for complete search history.

(56) References Cited

U.S. PATENT DOCUMENTS

| 3,801,979 | A |   | 4/1974 | Chisholm |
| 3,911,432 | A | * | 10/1975 | Williams ...................... 342/59 |
| 4,613,862 | A | * | 9/1986 | O'Donnell ..................... 342/59 |
| 4,689,622 | A | * | 8/1987 | Kuhrdt ......................... 342/14 |
| 5,317,320 | A | * | 5/1994 | Grover et al. ................ 342/159 |
| 6,856,276 | B2 | * | 2/2005 | Barrick et al. ................. 342/59 |

FOREIGN PATENT DOCUMENTS

| EP | 0 864 880 | 9/1998 |
| EP | 0864880 | 9/1998 |
| GB | 1 373 358 | 11/1974 |
| GB | 1373358 | 11/1974 |
| GB | 2393871 | 4/2004 |
| GB | 2 393 871 | 4/2006 |

* cited by examiner

*Primary Examiner*—Bernarr E Gregory
(74) *Attorney, Agent, or Firm*—Lowe Hauptman Ham & Berner, LLP

(57) ABSTRACT

A device and a method for eliminating interference between a radar working on the L frequency band and an aeronautical radio navigation equipment item, such as DME (Distance Measurement Equipment). When the radio navigation equipment operates, the radar emits periodically in all or part of the frequency band and then halts its emissions, each emission has a given duration and being separated from the previous emission by an interval of silence.

16 Claims, 3 Drawing Sheets

METHOD OF ELECTROMAGNETIC COUPLING BETWEEN A RADAR IN THE L BAND AND RADIONAVIGATION EQUIPMENT ITEM AND AUTOPROTECTION AND RADIONAVIGATION DEVICE

BACKGROUND OF THE INVENTION

The invention relates to a method of electromagnetic coupling between a radar in the L band and a radionavigation equipment item and to an autoprotection and radionavigation device. In particular, the invention applies to the electromagnetic coupling between an aeronautical radionavigation equipment item called a DME (Distance Measurement Equipment) and a radar working for example on the L frequency band, on board one and the same carrier.

In order to protect civil or military aircraft in particular from hostile firing of ground/air missiles, these carriers bear autoprotection systems implementing doppler radars working in the L band as means of detection, suitable for detecting and classifying these threats. However, certain carriers, most particularly commercial aircraft, use a radionavigation equipment item called a DME (Distance Measurement Equipment) working in the same frequency band. The DME radionavigation equipment item may be jammed by the emissions of the L-band radar. According to the configurations of the antennas of these two equipment items, the jamming engendered by the operation of the radar may prevent the DME from functioning.

To sidestep this problem, a solution consists in adapting the DME radionavigation equipment item as well as the autoprotection system in such a way that each equipment item is able to synchronize itself with the emissions of the other, by emitting for example while the other equipment item is silent. In addition to the determination of a priority equipment item that is master over the other, the problem arises of modifying the DME radionavigation equipment item already installed on carriers so that it can receive a new exterior compatibility and synchronization signal. Such a modification requires that the DME radionavigation equipment item be recertified, giving rise to a significant extra cost.

Another solution resides in the optimization of the positioning and of the directivity of the antennas of the L-band radar with respect to the antennas of the DME radionavigation equipment item. By increasing the directivity of the antennas and by positioning them in such a way that the antennas of the radar are not in view of the antennas of the DME radionavigation equipment item, the risk of jamming is reduced. However, this solution increases the zones not covered by the L-band radar. Moreover, contrary to military aircraft, the integration of equipment items onto commercial aircraft may hardly be done outside of a few well-defined and limited zones.

SUMMARY OF THE INVENTION

The aim of the invention is in particular to alleviate the aforesaid drawbacks. To this end, the subject of the invention is a method of electromagnetic coupling between at least one radionavigation equipment item emitting in a frequency band and at least one radar working in a same frequency band. The radionavigation equipment item being operational, the radar emits periodically in all or part of the frequency band and then halts its emissions, each emission:
 having an interval of a given duration,
 being separated from the previous emission by an interval of silence of a given duration.

The instant of commencement of each emission, the duration of each emission and the duration of each interval of silence are defined a priori. The frequency band in which the radionavigation equipment item and the radar emit is for example the L band. The radionavigation equipment item may be a distance measurement equipment item (DME). The duration of emission of the radar may be 125 ms with a tolerance interval of +/−10% and the duration of a silence of the radar may be 125 ms with a tolerance interval of +/−10%.

The subject of the invention is also an autoprotection and radionavigation device equipping a carrier. This device comprises:
 at least one radionavigation equipment item emitting in a frequency band;
 at least one autoprotection system comprising a radar emitting periodically in all or part of a same frequency band and then halting its emissions, each emission:
  having an interval of a given duration,
  being separated from the previous emission by an interval of silence of a given duration.

The instant of commencement of each emission, the duration of each emission and the duration of each interval of silence are defined a priori. The frequency band in which the radionavigation equipment item and the radar emit is for example the L band. The radionavigation equipment item may be a distance measurement equipment item (DME). The duration of emission of the radar may be 125 ms with a tolerance interval of +/−10%. The duration of a silence between two emissions of the radar may be 125 ms with a tolerance interval of +/−10%.

The antennas of the radar may be positioned for example on the carrier in the zone of coverage of the antennas of the radionavigation equipment item.

The carrier may be an aircraft, a helicopter or a drone.

The advantages of the invention are in particular that it makes it possible to integrate an autoprotection system with existing carriers and in particular with commercial aircraft, without hardware modification of the existing radionavigation equipment items such as the distance measurement equipment items DME. Moreover, the autoprotection system can operate parallel with the radionavigation equipment items without substantially degrading the performance thereof.

BRIEF DESCRIPTION OF THE DRAWINGS

Other characteristics and advantages of the invention will become apparent with the aid of the description which follows in conjunction with the appended drawings which represent.

MORE DETAILED DESCRIPTION

Figure 1:
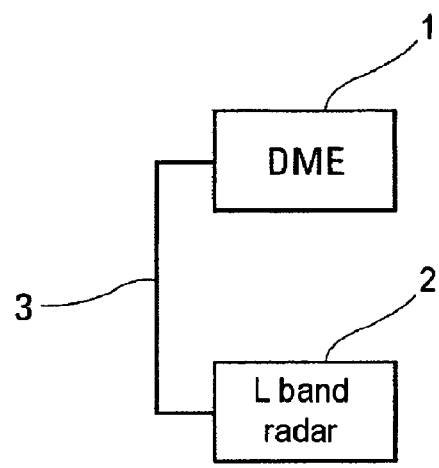
FIG. 1, a solution of cohabitation between a DME radionavigation equipment item and an autoprotection system comprising an L-band radar according to the prior art.

FIG. 1 illustrates a solution of cohabitation between a DME radionavigation equipment item and an autoprotection system comprising an L-band radar. Among the radionavigation equipment items on board commercial aircraft are a distance measurement equipment item, designated by the abbreviation DME. This radionavigation equipment item makes it possible to give the distance between an aeroplane and DME beacons situated on the ground. In its operating principle, the DME radionavigation equipment item emits trains of coded pulses in a frequency range stretching from 962 MHz to 1213 MHz, i.e. a part of the L band. This equipment item features among the list of equipment items that are critical as regards the safety of the carrier, and in this respect must be certified by the competent authorities.

The installation of an L-band radar within the framework of the implementation of an autoprotection system has brought to light the incompatibility of simultaneous operation of such a device and of a DME radionavigation equipment item. Moreover, the integration with the carrier of such a system is subject to the following constraints:

the detection and classification performance of the radar of the autoprotection system is conditioned by the appropriate disposition of the antennas of which it consists so as to maximize coverage;

the places available on certain carriers such as commercial aircraft are few in number.

Returning to FIG. 1. A link 3 between a DME radionavigation equipment item 1 and an L-band radar 2 included in the autoprotection system ensures the transmission of a signal of compatibility and of synchronization of the emissions between the two equipment items. The signal makes it possible to determine which equipment item is authorized to emit, while the other remains silent. Time windows, that is to say time intervals during which an equipment item is authorized to emit, are thus defined for the DME radionavigation equipment item 1 and for the L-band radar 2 of the autoprotection system.

Figure 2:
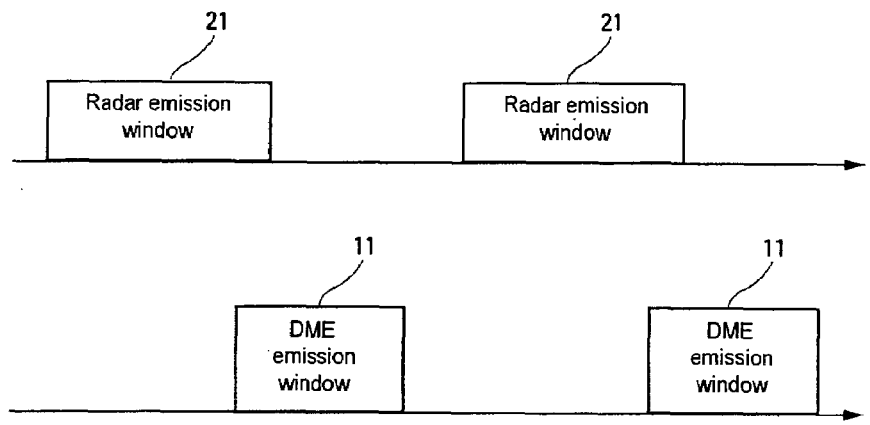
FIG. 2, the emission windows of the DME radionavigation equipment item and of the L-band radar of the autoprotection system, according to the prior art.

FIG. 2 corresponding to the mode of coupling presented in FIG. 1 shows on a time scale:

time windows 21 during which the radar 2 is authorized to emit;

time windows 11 during which the DME radionavigation equipment item 1 is authorized to emit.

Also the windows 21 and 11 do not overlap temporally, on account of the synchronization signal. The equipment items 1, 2 may thus operate without mutual disturbances.

However, the DME radionavigation equipment item 1 being a widespread equipment item installed on a large number of carriers, a modification for taking account of the compatibility signal passing through the link 3 requires that the equipment item be recertified, giving rise to a significant extra cost.

Figure 3:
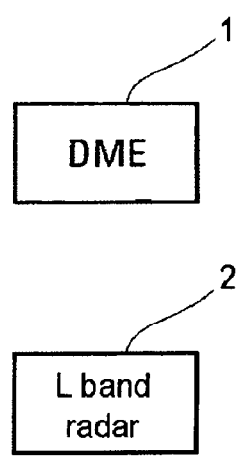
FIG. 3, the cohabitation between a DME radionavigation equipment item and an autoprotection system comprising an L-band radar with the implementation of the method according to the invention.

FIG. 3 illustrates the cohabitation between a DME radionavigation equipment item 1 and an autoprotection system comprising an L-band radar 2 with the implementation of the method according to the invention. In contradistinction to FIG. 1, no compatibility signal journeys between the DME radionavigation equipment item 1 and the L-band radar 2 of the autoprotection system, the DME radionavigation equipment item 1 emitting freely. The DME radionavigation equipment item 1 and the L-band radar 2 operate independently of one another.

Figure 4:
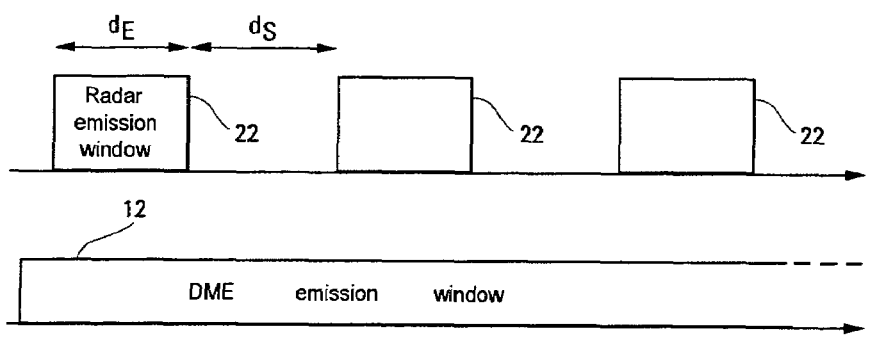
FIG. 4, the emission windows of the DME radionavigation equipment item and of the L-band radar of the autoprotection system, with the implementation of the method according to the invention.

FIG. 4 illustrates via two time charts a mode of coupling according to the invention, these charts showing on a time scale:

time windows 22 during which the radar 2 is authorized to emit;

time windows 12 during which the DME radionavigation equipment item 1 is authorized to emit.

The window 12 is unlimited, the DME radionavigation equipment item 1 thus emits freely. In order to allow the DME radionavigation equipment item 1 to operate, silence slots are interposed between each time window 22 of emission of the radar 2. The parameterization of the silence slots and of the duration of the time windows 22 is performed a priori by configuration, and does not need to change dynamically.

For example, experimentation shows that the extent of the emission window 22 for the radar 2 denoted $d_E$ may be configured a priori to 125 ms with a tolerance interval of +/−10% and the duration between two emission windows 22, denoted $d_S$, to 125 ms with a tolerance interval of +/−10%.

This configuration makes it possible not only to achieve the radar performance 2 necessary for detecting and classifying threats, but also to preserve the manner of operation of the DME radionavigation equipment item 1 without modification.

The phases of emission and of silence of the radar 2 are for example defined in software aboard the radar 2.

Figure 5:
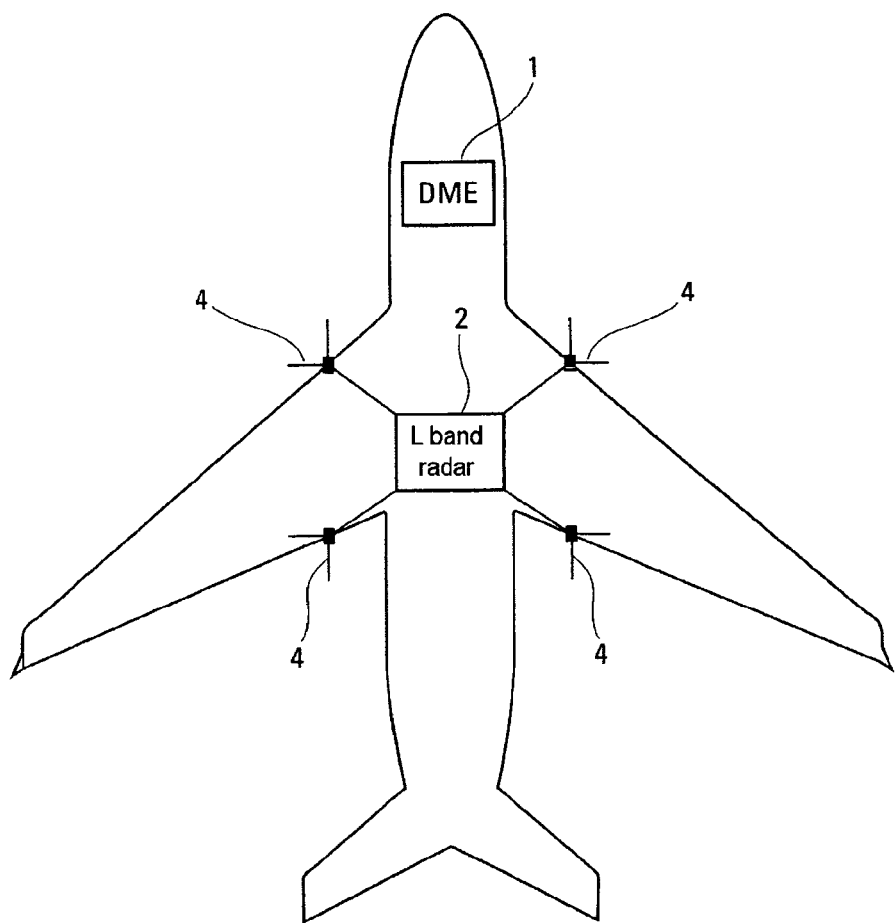
FIG. 5, an example of integration on a commercial aircraft of an autoprotection system of an L band radar and of a DME radionavigation equipment item.

FIG. 5 shows on a commercial aircraft an example of integration:

of an autoprotection device implementing in particular means of detecting threats such as ground/air missiles;

and of a radionavigation equipment item;

More particularly, FIG. 5 illustrates an autoprotection system comprising in particular an L-band radar 2 as well as its antennas 4 and a distance measurement equipment item 1, for example a DME radionavigation equipment item, with the implementation of the method of coupling according to the invention. No mechanism for synchronizing the emissions is implemented between the L-band radar 2 of the autoprotection system and the DME radionavigation equipment item 1.

The DME radionavigation equipment item 1 emits freely whereas the periods of emission 22 of the L-band radar 2 of the autoprotection system are followed by silence slots in accordance for example with FIG. 4. The parameterization of the silence slots and of the duration of the emissions is performed a priori by configuration, and does not need to change dynamically. For example, the L-band radar 2 of the autoprotection system may be configured so as to emit for 125 ms with a tolerance interval of +/−10% every 125 ms with a tolerance interval of +/−10%.

In this configuration it is possible to position antennas 4 associated with the L-band radar 2 of the autoprotection system at the places available on the carrier while having an optimal zone of coverage. The parameterization thus achieved even makes it possible to position the antennas 4 in the zone of coverage of the antennas of the DME radionavigation equipment item 1.

FIG. 5 illustrates an example of integration on a commercial aircraft of an autoprotection system of an L band radar and at a DME radionavigation equipment item. One could do likewise on any other carrier comprising at least one DME radionavigation equipment item or any other equipment item working in the L band and whose operating principle is similar, and at least one system comprising one or more L-band radars. By way of example may be cited a helicopter or a drone.

The invention has been described in respect of equipment items operating in the L-band. It may nevertheless be applied to other types of equipment item operating in one and the same frequency band.

What is claimed is:

1. A method for preventing interference by time division multiplexing the operation of a radar with respect to at least one radio navigation equipment item having an emitting frequency band and at least one radar working in the same frequency band, comprising the steps of:

operating the radio navigation equipment;
while the radio navigation equipment item is in operation without any compatibility signal journeying between the radio navigation equipment item and the radar, emitting periodically with the radar in all or part of the frequency band,
wherein:
each emission of the radar has a given duration ($d_E$), and
each emission of the radar is separated from the previous emission by an interval of silence having a given duration ($d_s$).

2. The method according to claim 1, wherein the duration ($d_E$) of each emission and the duration of each interval of silence ($d_s$) are pre-defined.

3. The method according to claim 1, wherein the frequency band in which the radio navigation equipment item and the radar emit is the L band.

4. The method according to claim 1, wherein the radio navigation equipment item is a distance measurement equipment item.

5. The method according to claim 4, wherein the duration of emission ($d_E$) of the radar is 125 ms with a tolerance interval of +/−10%.

6. The method according to claim 4, wherein the duration of a silence (ds) of the radar is 125 ms with a tolerance interval of +/−10%.

7. An apparatus for preventing interference by time division multiplexing the operation of a radar with respect to a radio navigation system, comprising:

a radio navigation equipment item emitting in a frequency band;
a radar system comprising a radar emitting periodically in all or part of the same frequency band, wherein each emission:
has an interval of a given duration ($d_E$), being separated from the previous emission by an interval of silence of a given duration ($d_S$).

8. The apparatus according to claim 7, wherein the radar is configured to emit radio signals in pre-define periods, wherein each emission has a pre-determined duration ($d_E$) and a pre-determined interval of silence ($d_S$) before each emission.

9. The apparatus according to claim 7, wherein the frequency band in which the radio navigation equipment item and the radar emit is L band.

10. The apparatus according to claim 7, wherein the radio navigation equipment item is a distance measurement equipment item.

11. The apparatus according to claim 10, wherein the duration of emission ($d_E$) of the radar is 125 ms with a tolerance interval of +/−10%.

12. The apparatus according to claim 10, wherein the duration of the interval of silence ($d_S$) between two emissions of the radar is 125 ms with a tolerance interval of +/−10%.

13. The apparatus according to claim 7, wherein the radar includes antennas that are positioned in a zone of coverage of antennas of the radio navigation equipment item.

14. The apparatus according to claim 7, wherein the apparatus is configured to be load on an carrier including aircraft.

15. The apparatus according to claim 14, wherein the carrier is a helicopter.

16. The apparatus according to claim 14, wherein the carrier is a drone.

* * * * *